Nov. 24, 1959 N. W. BELL 2,914,710

RING COUNTER

Filed Sept. 4, 1956

INVENTOR.
NORTON W. BELL

BY

Christie, Parker & Hale
ATTORNEYS

United States Patent Office 2,914,710

Patented Nov. 24, 1959

2,914,710

RING COUNTER

Norton W. Bell, Monrovia, Calif., assignor to Consolidated Electrodynamics Corporation, Pasadena, Calif., a corporation of California Application September 4, 1956, Serial No. 607,858

7 Claims. (Cl. 317—140)

This invention relates to ring counters and, more particularly, is concerned with a ring counter circuit utilizing relays.

Ring counters are well known in the computer art in which a binary state is transferred from one position to the next in a ring under the control of an external pulse source. Such ring counter circuits take a variety of forms and generally comprise electronic vacuum tube circuits or gas-discharge tube circuits.

The present invention provides a ring counter which utilizes relays and is characterized by its simplicity, reliabiilty, and low power consumption. The circuit requires but a single relay for each binary storage position in the ring and the binary state is transferred from one position to the next in the ring under the control of a switch or an external pulse.

In brief, the invention provides a plurality of balanced polarized relays, each of which includes first and second actuating coils and a relay-actuated switch. A plurality of series circuits, one of which is associated with each of the relays, are connected across a potential source having one side at ground reference potential. Each series circuit includes a resistor and a capacitor in series with one coil of each of two adjacent relays in the ring. A plurality of diodes respectively connect each of the series junction points between the resistors and capacitors in the series circuits through a shifting switch to the ground reference potential. The relay-actuated switches are respectively connected to a corresponding one of the series junctions between the resistors and capacitors in the series circuits, and to the ground reference potential. Each time the shifting switch is momentarily closed, a successive one of the relays in the ring is shifted to its opposite stable state and the previous relay is returned to its initial state.

Figure 1:
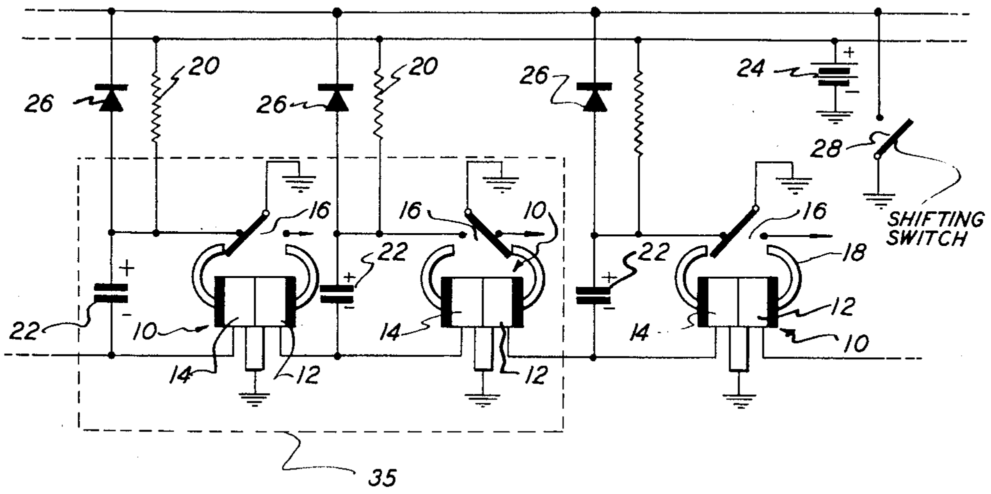
Figure 2:
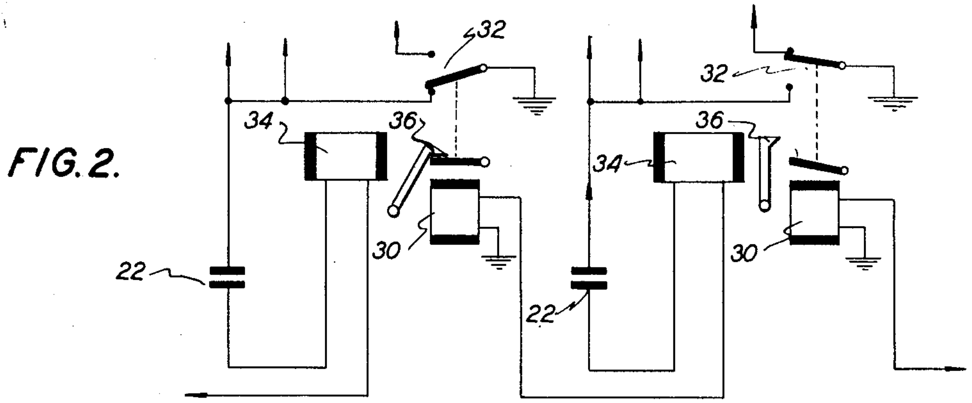

For a better understanding of the invention, reference should be had to the accompanying drawing, wherein:

Fig. 1 is a schematic diagram of a preferred embodiment of the present invention; and Fig. 2 is a schematic diagram of an alternative embodiment of the invention.

Referring to Fig. 1 in detail, the numeral 10 indicates generally a balanced type polarized relay, three of which are shown by way of example. However, it is to be understood that any number of two or more such relays may be used in the counter ring. Balanced polarized relays are well known in the art, a preferred type of relay being described in the article "Balanced Polarmercury Contact Relay" by J. T. L. Brown and E. E. Pollard, Bell System Technical Journal, vol. 32, pages 1393–1413, November 1953. The balanced polarized relay is characterized by the fact that a pulse of current applied to the relay coil in one direction causes the relay to change its condition and actuate the associated switch. A current then applied in the opposite direction reverses the relay and throws the switch to its opposite condition.

For the purpose of the present invention, it is desirable to supply the relay with two coils so that current pulses for actuating the relay to one condition or the other can be applied to separate coils in separate actuating circuits. Thus, as shown in Fig. 1, each of the relays 10 comprises a first coil 12 and a second coil 14 which actuate a single-pole double-throw switch 16. The switch 16 is held in one position or the other by residual magnetism in the relay core 18, or may be held in position by means of separate permanent magnets in conventional manner.

It should be noted that each of the stages, including a balanced polarized relay 10, is identical to every other stage and accordingly the same reference characters are used to indicate similar elements in each stage.

Each stage includes a resistor 20 and a capacitor 22 connected in series with one coil of each two adjacent relays across a potential source 24. In the form of the invention shown in Fig. 1, the two coils 12 and 14 of the two adjacent relays are connected in shunt between ground and the capacitor 22. The common junction point in each of the series circuits between the resistor 20 and the capacitor 22 is connected to ground by a diode 26 through a common shifting switch 28 when closed.

Considering the operation of the circuit of Fig. 1, assume all of the relay-actuated switches 16 but one as being polarized in the direction to connect the common junctions between the resistors 20, capacitors 22, and diodes 26 to ground. This may be accomplished initially by manually setting the switches in their proper state or by providing an external polarizing circuit for setting the relays to the desired initial condition. Only in the relay in which the series junction point is not grounded, which in Fig. 1 is the middle relay, is a charge stored on the capacitor 22 by the potential source 24.

When the shifting switch 28 is momentarily closed, the charge on the capacitor 22 of the middle relay is discharged, causing a current to flow through the coil 14 of the middle relay of Fig. 1 and the coil 12 of the next adjacent relay in the counter ring. As a result, the two relays are actuated to reverse the initial condition of their respective switches whereby the unique stable condition of the middle relay, as initially set, is transferred to the next relay in the ring.

When the shifting switch 28 is again opened, it causes the capacitor 22 associated with the next relay in the ring to charge up. This produces a current flow through the associated coil 14, but it is in a direction to maintain the relay in its same polarized condition.

Thus, it will be seen that each time the shifting switch 28 is momentarily closed, the next successive relay in the counter ring is caused to change its stable condition. Any number of relays can be used in the ring and they can be connected back to form a closed ring. The switches 16 can be used to actuate an external output circuit, if desired, the switch acting as a low impedance current path for such purpose.

Referring to Fig. 2, there is shown a modified version of the circuit of Fig. 1 in which the conventional mechanical type latch relay is shown in place of the balanced polarized relay of Fig. 1. The latch type relay consists of a primary coil 30 which actuates a switch 32. A latch coil 34 actuates a latch 36 to release the armature associated with the primary coil 30 when the latch relay coil 34 is energized. Fig. 2 further shows that the coils in successive relays can be connected in series rather than in parallel as shown in Fig. 1. Thus, the latch coil 34 of one relay is connected in series with the primary coil 30 of the next relay.

The operation of the circuit of Fig. 2 is identical to that of the circuit of Fig. 1 and may be connected directly into the circuit of Fig. 1 by replacing the portion of the circuit shown within the dotted line box 35 of Fig. 1.

I claim:

1. A ring counter circuit comprising a two-terminal potential source having one terminal at ground reference, a plurality of balanced polarized relays, each including first and second actuating coils and a relay-actuated switch, a plurality of series circuits connected in shunt across the potential source, each series circuit comprising a resistor connected to the high potential terminal of the source, a capacitor in series with the resistor, and one coil of each of two relays connecting the capacitor to the ground reference terminal of the source, a plurality of diodes connected respectively to a corresponding one of the series junctions between the resistor and capacitor in the series circuits, and switching means connecting the opposite terminals of the diodes to the ground reference terminal of the source, the relay-actuated switches being respectively connected to a corresponding one of the series junctions between the resistors and capacitor in the series circuits and to the ground reference terminal of the source.

2. A ring counter circuit as defined in claim 1 wherein the respective coils of the two relays connected in each of the series circuits are connected in shunt with each other.

3. A ring counter circuit as defined in claim 1 wherein the respective coils of the two relays connected in each of the series circuits are connected in series with each other.

4. A ring counter circuit comprising a two-terminal potential source having one terminal at ground reference, a plurality of relays, each including first and second actuating coils and a relay-actuated switch, a plurality of series circuits connected in shunt across the potential source, each series circuit comprising a resistor connected to the high potential terminal of the source, a capacitor in series with the resistor, and one coil of each of two relays connecting the capacitor to the ground reference terminal of the source, a plurality of diodes connected respectively to a corresponding one of the series junctions between the resistor and capacitor in the series circuits, and switching means connecting the opposite terminals of the diodes to the ground reference terminal of the source, the relay-actuated switches being respectively connected to a corresponding one of the series junctions between the resistors and capacitor in the series circuits and to the ground reference terminal of the source.

5. A circuit as defined in claim 4 wherein said relays are of a latch type wherein current pulses to the respective coils of each relay biases the relay switch to one of two stable positions.

6. A ring counter circuit comprising a two-terminal potential source, a plurality of relays each including first and second actuating coils and a relay-actuated switch, a plurality of series circuits connected in shunt across the potential source, each series circuit comprising a resistor connected to one terminal of the source, a capacitor in series with the resistor and one coil of each of the two relays connecting the capacitor to the other terminal of the source, and means including a shifting switch for simultaneously connecting each of the series junctions between the resistors and capacitors to said other terminal of the potential source, whereby any capacitor charged up from said potential source through a relay-actuated switch is discharged through two of the relays when the shifting switch is closed.

7. A ring counter circuit comprising a plurality of relays, each including a pair of coils and a switch, the relays and associated switches having two stable conditions to which they are set by pulsing a current through respective ones of said two coils, a plurality of storage capacitors, a potential source, means including the relay switches for selectively charging up the storage capacitors from the potential source, one relay switch being associated with each capacitor, only one at a time of the relays normally being polarized with its associated switch condition to charge the associated capacitor, whereby only one capacitor at a time is charged from the potential source, and means including a shifting switch for simultaneously connecting each of the capacitors in circuit with one coil of each of two different relays, whereby the particular charged capacitor discharges through the coils in the two associated relays when the shifting switch is actuated so as to reverse the polarity of two of the relays in the ring counter circuit whenever the shifting switch is actuated.

References Cited in the file of this patent

UNITED STATES PATENTS

| | | |
|---|---|---|
| 2,347,194 | Holliday | Apr. 25, 1944 |
| 2,600,648 | Herrick | June 17, 1952 |
| 2,635,197 | Routledge | Apr. 14, 1953 |